United States Patent [19]

Gancy et al.

[11] 4,238,347
[45] Dec. 9, 1980

[54] AMORPHOUS POLYALUMINUM SULFATE COMPOSITIONS

[75] Inventors: Alan B. Gancy, Syracuse; Christian A. Wamser, Camillus, both of N.Y.

[73] Assignee: Allied Chemical Corporation, Morris Township, Morris County, N.J.

[21] Appl. No.: 65,313

[22] Filed: Aug. 9, 1979

[51] Int. Cl.³ .............................................. C02F 5/02
[52] U.S. Cl. ................................ 252/175; 252/80; 252/317; 423/305; 423/306; 423/308; 423/309; 423/311; 423/625; 423/629; 424/128; 424/154
[58] Field of Search .......................... 252/175, 80, 317; 210/42 R; 423/305, 306, 308, 309, 311, 625, 629; 424/128, 154

[56] References Cited

U.S. PATENT DOCUMENTS

| | | | |
|---|---|---|---|
| 3,147,227 | 9/1964 | Hansford | 252/317 |
| 3,929,666 | 12/1975 | Aiba et al. | 252/175 X |
| 4,131,545 | 12/1978 | Redmayne et al. | 252/175 X |

*Primary Examiner*—Mayer Weinblatt
*Attorney, Agent, or Firm*—Thomas D. Hoffman; Horst M. Kasper

[57] ABSTRACT

A process is disclosed for preparation of an amorphous polyaluminum sulfate composition of the formula $$Al(OH)_x(SO_4)_y(H_2PO_4)_z(H_2O)_w$$

wherein
x is about 0.75 to 1.5
y is about 0.7 to 1.07
z is about 0 to 0.2
w is about 2.0 to 4.2 with the proviso that the sum $x+2y+z$ is 3. Water is withdrawn from a fairly fresh polyaluminum sulfate solution having the formula $$Al(OH)_{x'}(SO_4)_{y'}(H_2PO_4)_{z'}(H_2O)_{w'}$$

wherein
x' is about 0.75 to 1.5
y' is about 0.7 to 1.07
z' is about 0 to 0.2
w' is about 18 to 65 with the proviso that the sum $x'+2y'+z'$ is 3. The amorphous composition is useful for reconstitution with water to prepare a coagulant solution.

11 Claims, No Drawings

AMORPHOUS POLYALUMINUM SULFATE COMPOSITIONS

FIELD OF THE INVENTION

The invention relates to amorphous polyaluminum sulfate compositions useful as coagulants in water treatment.

BACKGROUND OF THE INVENTION

Clark et al. in British Pat. No. 445,711 issued Apr. 16, 1936 disclose phosphate containing solutions of basic aluminum sulfates and precipitates from such solutions.

SUMMARY OF THE INVENTION

According to the present invention there are provided amorphous polyaluminum sulfate compositions of the formula $$Al(OH)_x(SO_4)_y(H_2PO_4)_z(H_2O)_w$$

wherein
x is about 0.75 to 1.5;
y is about 0.7 to 1.07;
z is about 0 to 0.2; and
w is about 2.0 to 4.2
with the proviso that the sum of $x+2y+z$ is 3.

The polyaluminum sulfate compositions are prepared by volatilizing water from a aqueous polyaluminum sulfate solution having the formula $$Al(OH)_{x'}(SO_4)_{y'}(H_2PO_4)_{z'}(H_2O)_{w'}$$

wherein
$x'$ is about 0.75 to 1.5
$y'$ is about 0.7 to 1.07
$z'$ is about 0 to 0.2
$w'$ is about 18 to 65
with the proviso that the sum of $x'+2y'+z'$ is 3. The resulting amorphous compositions can be reconstituted with water to solutions useful as high performance coagulants. The amorphous compositions eliminate excessive shipping costs and space requirements and preserve the coagulating properties in storage and transit.

DETAILED DESCRIPTION OF THE INVENTION AND OF THE PREFERRED EMBODIMENTS

The present invention provides amorphous polyaluminum sulfate compositions of the following formula $$Al(OH)_x(SO_4)_y(H_2PO_4)_z(H_2O)_w$$

wherein
x is about 0.75 to 1.5;
y is about 0.7 to 1.07;
z is about 0 to 0.2; and
w is about 2.0 to 4.2 with the proviso that the sum $x+2y+z$ is 3;
Preferred compositions of the above formula have
x is about 1.1 to 1.3;
y is about 0.8 to 0.9;
z is about 0.10 to 0.14; and
w is about 2.5 to 3.5 with the proviso that the sum $x+2y+z$ is 3.

The amorphous polyaluminum sulfate compositions are prepared by volatilizing water from a polyaluminum, sulfate solution having the formula $$Al(OH)_{x'}(SO_4)_{y'}(H_2PO_4)_{z'}(H_2O)_{w'}$$

wherein
$x'$ is about 0.75 to 1.5;
$y'$ is about 0.7 to 1.07;
$z'$ is about 0 to 0.2; and
$w'$ is about 18 to 65 with the proviso that the sum of $x'+2y'+z'$ is 3.

$w'=18-65$ corresponds to about 4 to 10 weight percent $Al_2O_3$ in solution. Amorphous materials include materials which do not exhibit long range order of atoms in a solid.

Aqueous polyaluminum sulfate solutions suitable as starting materials are obtainable by reacting aluminum sulfate with ground calcium carbonate optionally in the presence of phosphoric acid and filtering to separate the precipitated gypsum formed from the desired basic aqueous polyaluminum sulfate solution. The process runs in accordance with the following equation:

$$\tfrac{1}{2}Al_2(SO_4)_3+(3/2-y')CaCO_3+z'H_3PO_4+(w'+3/2x'+\tfrac{1}{2}z')H_2O$$
$$\rightarrow Al(OH)_{x'}(SO_4)_{y'}(H_2PO_4)_{z'}(H_2O)_{w'}+(3/2-y')CaSO_4.2H_2O+(3/2-y')CO_2$$

Such processes are disclosed in British Pat. No. 445,711 issued Apr. 16, 1936 and in J. Chem. Soc. Ind. T. 56, 139-56 (1937), which are herein incorporated by reference.

x, y, z, w and $x'$, $y'$, $z'$, $w'$ are defined as the number of OH radicals, $SO_4$ radicals, $H_2PO_4$ radicals and water molecules present per aluminum atom present.

The percent basicity of a polyaluminum sulfate solution is defined as $100x/3$ or $100x'/3$, respectively, where x and $x'$ are the respective molar ratios of OH to Al.

Amorphous materials of the present invention have $x=0.75$ to 1.5 are preferably $x=1.1$ to 1.3.

For employment of the compositions as coagulants they are redissolved in water. High dissolving rates are most desirable for the amorphous polyaluminum sulfate compositions. Compositions which do not dissolve in water do not lead to a solution useful as a coagulant. The dissolving rate of the compositions depends on numerous factors including temperature, composition, drying temperature, drying rate.

The phosphate content as defined by z can be between 0.0 and 0.2 and preferably between 0.10 and 0.14. The water can be volatilized in a drying process.

The drying temperature is generally below 100° C. and preferably between 25° C. and 100° C. For rapid water withdrawal, higher drying temperatures from about 80° C. to 100° C. are preferred. For gentle water withdrawal, lower drying temperatures below about 30° C. are preferred. The vapor pressure during volatilization is not critical. The partial pressure of water in equilibrium depends on the temperature.

The water vapor pressure during water withdrawal can be below or about one atmosphere and is preferably below 100 mm Hg.

The drying time depends on the drying temperature, drying pressure, amount of composition being dried and the configuration employed.

In general, volatilizing water gets more difficult with increasing dryness of the composition. Compositions of lower basicity can be dried to a higher degree than compositions with higher basicity under similar conditions without impairing redissolving the composition in water. For example, materials with x=1.35 to 1.44 cannot be dried to w less than about 3 at about 80° C. without impairing the dissolution rate of the product.

However, materials with x=1.2 can be dried to w less than about 3 at about 80° C. without impairing the dissolution rate of the product. The more water which is recovered from solid polyaluminum sulfate the less easy it will be to redissolve the resulting solid. A preferred material will have a w of from about 2.5 to 3.5.

The volatilization of water from the solution can be achieved by freeze drying and spray drying methods. Alternatively, the solutions can be dried in a fluidized bed.

The age of the starting solutions influences the dissolution of the product. Assuming storage of the starting solutions at room temperature, the water should be withdrawn preferably within about 15 days. Upon storage at higher temperature the water should be withdrawn within a shorter time period. In order to enhance dissolution rate the solutions should be converted to glasses before the solutions have a chance to age. Furthermore, the incorporation of phosphate in the materials of the present invention increases the redissolvability of the materials.

A dewatered polyaluminum sulfate material provides advantages over polyaluminum sulfate solutions. Such solutions are unstable with time. The material consumes less volume, is stable and does not require stabilization additives. Reconstitution to a solution is a much simpler process than ab initio preparation of a solution. Employing amorphous polyaluminum sulfate compositions has the advantage of a size and weight reduction of the product used and enables easier packaging and storing with lower requirements as to space. The transformation to the solid state also facilitates handling of the product. The dewatered product has lower shipping cost compared with a solution. The amorphous compositions are also easier preserved as active coagulants in storage and transit.

EXAMPLE 1

Drying of Aqueous Polyaluminum Sulfate Solutions to Constant Weight

Polyaluminum sulfate solutions of differing basicities and phosphate contents were evaporated to constant weight, either in a low water partial pressure container in the presence of a desiccating agent at room temperature or in an 80° C. oven. Knowing the $Al_2O_3$ concentration of the original solution, and the weight losses upon drying, the final concentration of $Al_2O_3$ in the glasses could be determined.

Table 1

Amount of Water Retained in Drying of Polyaluminum Sulfate Solutions
$H_2O/Al$

| Basicity Expressed, as "x" | Phosphated,* 25° C. Dryig | Non-Phosphated, 25° C. Drying |
|---|---|---|
| 0 | 6.9 | 7 |
| 0.5 | 4 | 4.6 |
| 1.0 | 3.5 | 3.8 |
| 1.5 | 2.8 | 3 |

Table 1-continued

Amount of Water Retained in Drying of Polyaluminum Sulfate Solutions
$H_2O/Al$

| | Phosphated,* 80° C. Drying | Non-Phosphated, 80° C. Drying |
|---|---|---|
| 0 | 5 | 4.9 |
| 0.5 | 3.1 | 2.8 |
| 1.0 | 2.7 | 2.4 |
| 1.5 | 2 | 1.8 |

*All samples contained 2% $PO_4$, 10% $Al_2O_3$ basis.

It was found that more water is lost at 80° C. than at room temperature. (Table 1) At 80° C., however, phosphated samples lose significantly less water than do non-phosphated systems. At room temperature, phosphated and non-phosphated systems lose about the same amounts of water.

The relationship between the amount of water retained by an amorphous polyaluminum sulfate composition and its basicity can be observed in Table 1. The higher the basicity, the less water is held by the amorphous composition. Water content is expressed as the mol ratio $H_2O/Al$. At 80° C. phosphated polyaluminum sulfate retains more water than non-phosphated polyaluminum sulfate. However, the inverse of this held for 25° C. evaporation.

Table 2

Amount of Water and Hydroxyl Ion Retained in Drying of Polyaluminum Sulfate Solutions
$(H_2O + OH)/Al$

| Basicity | Phosphated,* 25° C. Drying | Non-Phosphated, 25° C. Drying |
|---|---|---|
| 0 | 6.9 | 7 |
| 0.5 | 4.5 | 4.8 |
| 1.0 | 4.5 | 4.7 |
| 1.5 | 4.3 | 4.5 |

| | Phosphated,* 80° C. Drying | Non-Phosphated, 80° C. Drying |
|---|---|---|
| 0 | 5 | 4.9 |
| 0.5 | 3.5 | 3.7 |
| 1.0 | 3.5 | 3.7 |
| 1.5 | 3.3 | 3.5 |

*All samples contained 2% $PO_4$, 10% $Al_2O_3$ basis.

The total of water and hydroxyl ion associated with the aluminum was found to be fairly constant over a broad range of polyaluminum sulfate basicity (Table 2). As before, the actual level of $[OH+H_2O]$ in the polyaluminum sulfate amorphous material is a function of the drying temperature and the phosphate level. Examples of the empirical compositions of amorphous materials formed were:

$Al(OH)_{1.53}(SO_4)_{0.735}.3H_2O$, and $Al(OH)_{1.40}(SO_4)_{0.75}(H_2PO_4)_{0.1}.3H_2O$

EXAMPLE 2

Amorphous Polyaluminum Sulfate Dissolution Rates

The test for solubilization rate of amorphous compositions was based on observation of the time required for essentially complete solubilization of a weighed portion of the ground test sample in about 150 milligrams of water. The test provided useful relative data for comparing the dissolution rate of compositions prepared under various conditions.

A sample of the solid to be tested was ground for about 30 seconds in a small agate mortar. A sample containing about 15 milligrams of $Al_2O_3$ (i.e. about 50 milligrams for a polyaluminum sulfate solid containing 30% $Al_2O_3$ or 75 milligrams for a solid containing 20% $Al_2O_3$) was transferred onto the center of a tared 7.5×5 cm glass slide. A drop of deionized water from a dropping pipet (selected to deliver approximately 50 milligrams of water per drop) was placed on the slide near the sample and brought in contact with the sample with the bent flattened end of a small micro-spatula. The mixture was stirred to a paste and a second drop of water was similarly treated. A total of 3 drops of water were added within a total period of 20 seconds.

The mixture was continually agitated on the slide in the form of a circular film about 2.5 cm in diameter.

The time required for essentially complete dissolution of the sample was noted. The observation was best when made by placing the slide on a dull black paper surface. Initial dissolution rate measurements on amorphous polyaluminum sulfate material showed a marked dependency of rate upon the drying temperature. Example 1 indicated that the amount of residual water in polyaluminum sulfate glass was dependent upon drying temperature. The dependence of the amorphous composition dissolution rate on its residual water content was determined by taking amorphous polyaluminum sulfate composition samples which has been dried to constant weight at room temperature, and packing them tightly into metal capsules. The capsules were then sealed with epoxy resin cement.

Capsules were carefully weighed, then subjected to 80° C. for typical test time durations. Lack of weight loss was confirmed by re-weighing the capsules. Blank determinations were made on cement itself to ensure that there were no compensating weight changes due to thermal effects on the cement.

It was found that the slower dissolution rates of compositions dried at higher temperature were mostly, but not completely dependent on the amount of water retained after withdrawal of the water.

It was also found that a 40% basicity glass could be heated to 80° C. with no measurable deleterious effect upon its dissolution rate.

The results also showed that the higher the basicity the more slowly amorphous polyaluminum sulfate compositions dissolved.

EXAMPLE 3

Effect of Polyaluminum Sulfate Solution Age, Basicity, and Phosphate Content on the Dissolution Rate of the Amorphous Composition Proceeding as indicated in Example 2 it was found that as polyaluminum sulfate solutions age, the amorphous compositions prepared therefrom dissolve relatively more slowly. There was a transformation occurring in solution which was not manifest as turbidity formation or any other visible change.

Therefore, polyaluminum sulfate solutions were not stored more than 1 to 2 weeks after preparation before they were evaporated to form amorphous materials.

Phosphoric acid was added to solutions of Example 1 in an amount of 0.2 parts by weight of $PO_4$ radical per part by weight of the formula units of $Al_2O_3$ in the solution.

Unexpectedly it was found that incorporation of phosphate into polyaluminum sulfate favorably affected the resultant amorphous material dissolution rate.

The most rapidly dissolving amorphous polyaluminum sulfate material derived to date has been made from fresh solution having a 40% basicity. The drying was done at 25° C. The rate was comparable to that of reagent grade aluminum sulfate hydrate which requires about 0.5 minutes to dissolve under the identical test conditions.

We claim:

1. An amorphous polyaluminum sulfate a composition of the formula $$Al(OH)_x(SO_4)_y(H_2PO_4)_z(H_2O)_w$$

wherein
  x is about 0.75 to 1.5;
  y is about 0.7 to 1.07;
  z is about 0 to 0.2; and
  w is about 2.0 to 4.2
with the proviso that $x+2y+z$ is 3.

2. The amorphous composition as set forth in claim 1 wherein w is about 2.5 to 3.5.

3. The amorphous composition as set forth in claim 1 wherein x is about 1.1 to 1.3.

4. The amorphous composition as set forth in claim 1 wherein z is about 0.1 to 0.14.

5. A process for preparing an amorphous polyaluminum sulfate composition of the formula $$Al(OH)_x(SO_4)_y(H_2PO_4)_z(H_2O)_w$$

wherein
  x is about 0.75 to 1.5;
  y is about 0.7 to 1.07;
  z is about 0 to 0.2; and
  w is about 2.0 to 4.2
with the proviso that $x+2y+z$ is 3, comprising volatilizing water from a polyaluminum sulfate solution having the formula $$Al(OH)_{x'}(SO_4)_{y'}(H_2PO_4)_{z'}(H_2O)_{w'}$$

wherein
  x' is about 0.75 to 1.5;
  y' is about 0.7 to 1.07;
  z' is about 0 to 0.2; and
  w' is about 18 to 65
with the proviso that $x'+2y'+z'$ is 3.

6. The process as set forth in claim 5 wherein the water is volatilized from the solution by heating the solution to a temperature of between 25° C. and 100° C. under atmospheric pressure.

7. The process as set forth in claim 6 wherein the temperature is between 80° C. and 100° C.

8. The process as set forth in claim 5 wherein the water is volatilized from the solution by subjecting the solution to a reduced pressure.

9. The process as set forth in claim 5 wherein the water is volatilized from the solution by freeze drying.

10. The process as set forth in claim 5 wherein the water is volatilized from the solution by spray drying.

11. The process as set forth in claim 5 wherein the water is volatilized from the solution in a fluidized bed.

* * * * *